US009389329B2

(12) United States Patent  
Swett

(10) Patent No.: US 9,389,329 B2  
(45) Date of Patent: Jul. 12, 2016

(54) ACOUSTIC SOURCE WITH PIEZOELECTRIC ACTUATOR ARRAY AND STROKE AMPLIFICATION FOR BROAD FREQUENCY RANGE ACOUSTIC OUTPUT

(71) Applicant: Baker Hughes Incorporated, Houston, TX (US)

(72) Inventor: Dwight W. Swett, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 288 days.

(21) Appl. No.: 14/230,533

(22) Filed: Mar. 31, 2014

(65) Prior Publication Data

US 2015/0275655 A1    Oct. 1, 2015

(51) Int. Cl.
| | |
|---|---|
| *G01V 3/00* | (2006.01) |
| *E21B 47/00* | (2012.01) |
| *E21B 47/16* | (2006.01) |
| *B06B 1/06* | (2006.01) |
| *G01V 1/44* | (2006.01) |
| *G01V 1/02* | (2006.01) |

(52) U.S. Cl.  
CPC *G01V 1/44* (2013.01); *G01V 1/159* (2013.01); *G01V 2200/16* (2013.01); *G01V 2210/1299* (2013.01)

(58) Field of Classification Search  
CPC ......... E21B 47/12; E21B 23/14; E21B 47/18; E21B 47/16; G01V 1/44; G01V 1/52; H04R 17/00  
USPC .............. 340/855.4–855.6, 856.4; 166/254.2; 367/82, 140  
See application file for complete search history.

(56) References Cited

U.S. PATENT DOCUMENTS

| | | | |
|---|---|---|---|
| 4,202,425 A | 5/1980 | Hambrick et al. | |
| 4,722,417 A | 2/1988 | Selsam | |
| 5,063,542 A | 11/1991 | Petermann et al. | |
| 5,283,768 A | 2/1994 | Rorden | |
| 5,317,111 A * | 5/1994 | Orban .................. | B06B 1/0681 175/40 |
| 5,389,848 A * | 2/1995 | Trzaskos ............... | B06B 1/0611 310/322 |

(Continued)

FOREIGN PATENT DOCUMENTS

CN            102870010 A        1/2013

OTHER PUBLICATIONS

PCT International Search Report, International Filing Date of Mar. 30, 2015.

(Continued)

*Primary Examiner* — George Bugg  
*Assistant Examiner* — Munear Akki  
(74) *Attorney, Agent, or Firm* — Bracewell LLP

(57) ABSTRACT

An acoustic energy source that amplifies the stroke of electrically reactive elements having a body with an elastomer filled first cavity, a highly incompressible fluid filling a second cavity, and bores intersecting the second cavity that extend radially outward from second cavity. Quill assemblies in the bores each include an electrically reactive element and a tip projecting radially into the second cavity. A dynamic yoke having a lower portion projecting into the second cavity, and a pressure disk projects into the first cavity. A diaphragm on the body and on a side of the dynamic yoke opposite its lower portion. A fluid forms a film between the dynamic yoke, static yoke and quill tips. Applying alternating electricity reciprocates the tips into and out of the second cavity; reciprocates the dynamic yoke and diaphragm to generate the acoustic energy.

17 Claims, 8 Drawing Sheets

(56) References Cited

U.S. PATENT DOCUMENTS

| | | | |
|---|---|---|---|
| 5,477,101 A * | 12/1995 | Ounadjela | G10K 9/121 |
| | | | 310/328 |
| 5,644,186 A * | 7/1997 | Birchak | G10K 11/004 |
| | | | 310/337 |
| 6,213,250 B1 | 4/2001 | Wisniewski et al. | |
| 6,318,497 B1 | 11/2001 | De Groot et al. | |
| 6,466,513 B1 * | 10/2002 | Pabon | B06B 1/067 |
| | | | 181/105 |
| 7,364,007 B2 * | 4/2008 | Garcia-Osuna | E21B 47/01 |
| | | | 166/250.16 |
| 7,570,543 B2 | 8/2009 | Ferguson | |
| 2005/0022987 A1 | 2/2005 | Green et al. | |
| 2012/0069708 A1 | 3/2012 | Swett | |
| 2012/0090837 A1 * | 4/2012 | Swett | G01V 1/135 |
| | | | 166/254.2 |
| 2014/0373619 A1 * | 12/2014 | Slay | E21B 47/14 |
| | | | 73/152.58 |

OTHER PUBLICATIONS

International Search Report with Written Opinion issued in International Application No. PCT/US2011/056258, dated Jun. 1, 2012, 11 pages.

* cited by examiner

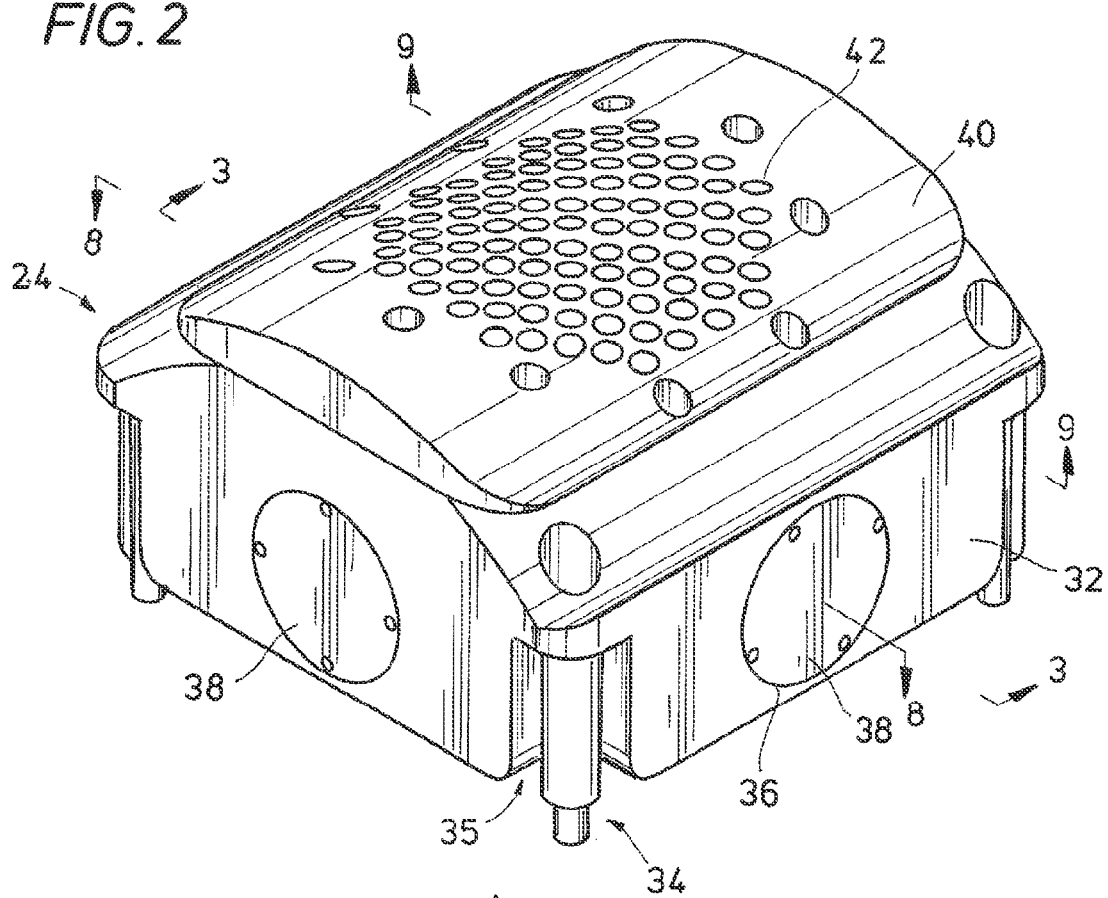
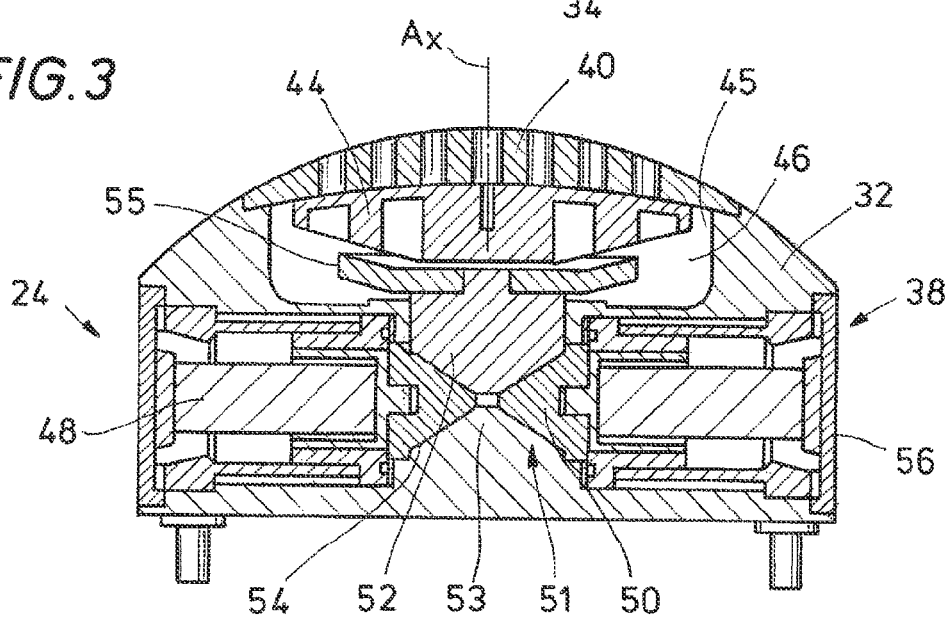

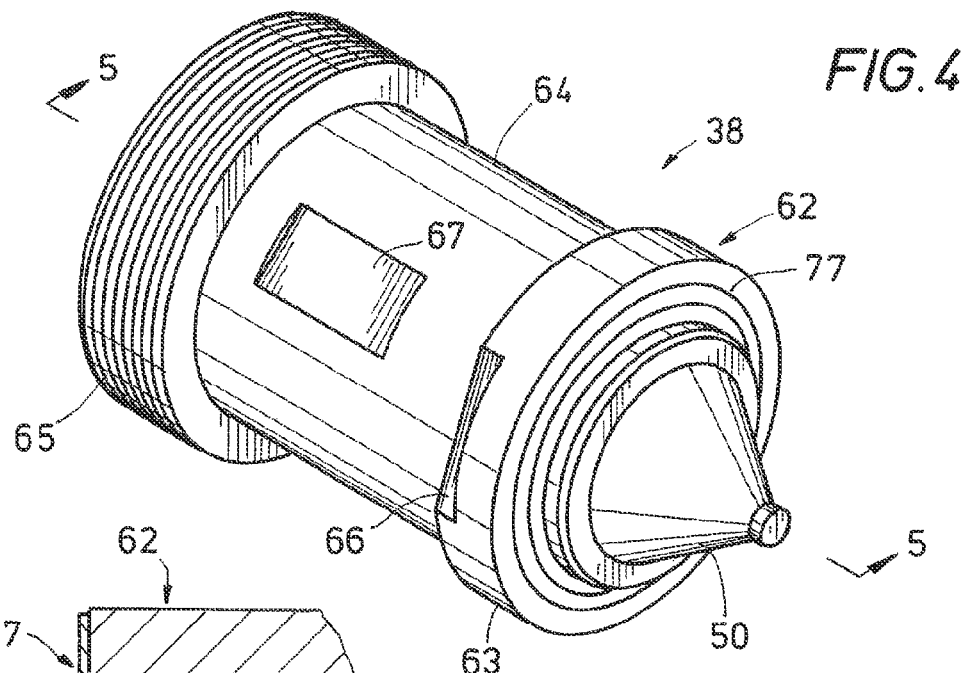
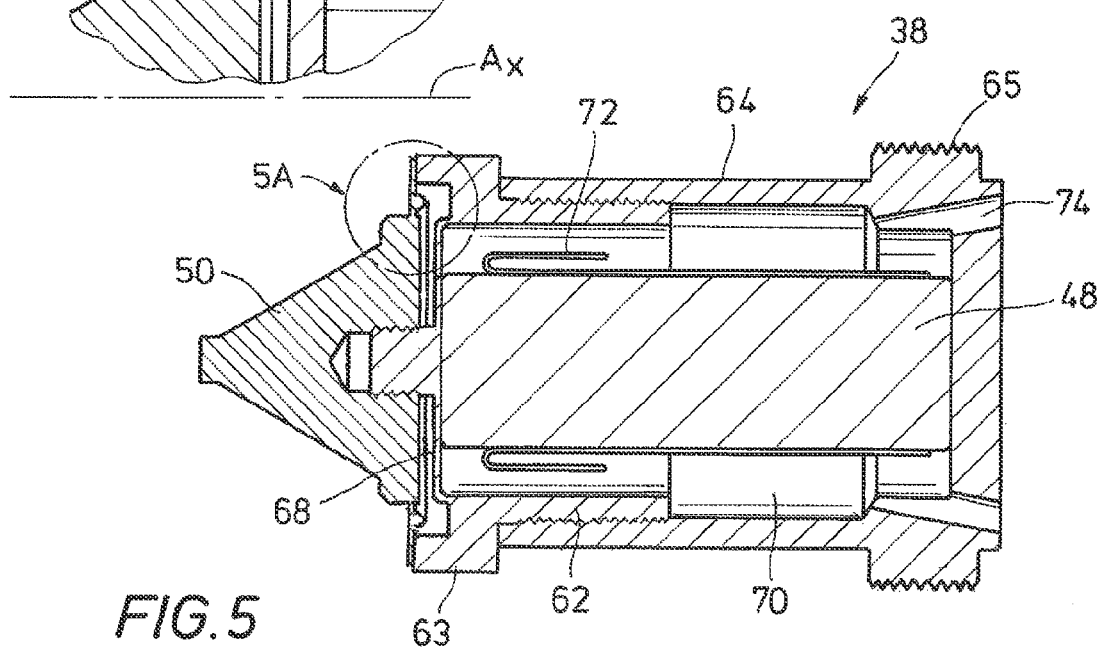

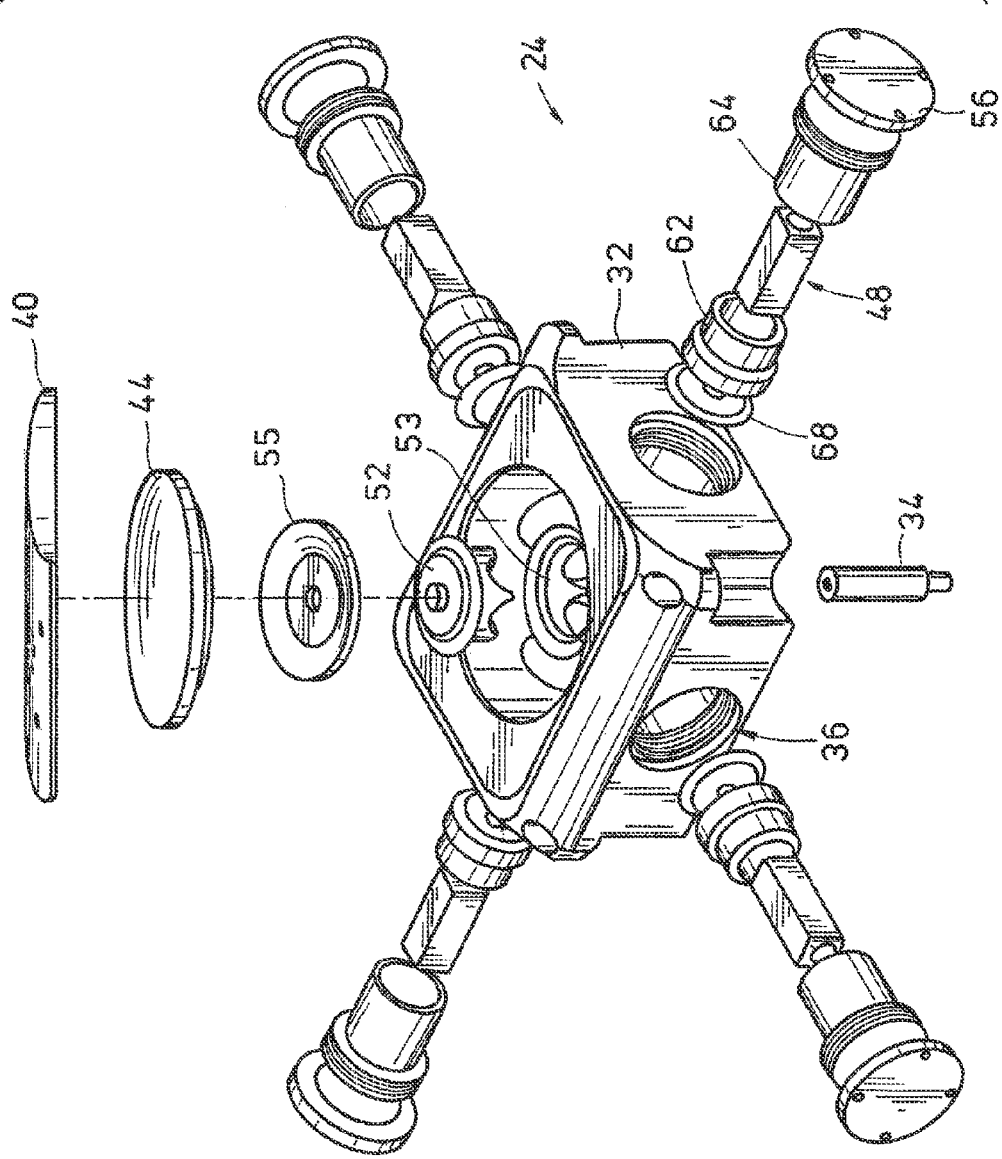

US 9,389,329 B2

ACOUSTIC SOURCE WITH PIEZOELECTRIC ACTUATOR ARRAY AND STROKE AMPLIFICATION FOR BROAD FREQUENCY RANGE ACOUSTIC OUTPUT

BACKGROUND OF THE INVENTION

1. Field of Invention

The present disclosure relates in general to an acoustic source with an array of at least one actuator that amplifies an input displacement stroke to optimize the magnitude of an acoustic output from the acoustic source. More specifically, the present disclosure relates to an acoustic source that amplifies an input displacement stroke from piezoelectric elements to generate the output signal.

2. Description of Prior Art

Information about a subterranean formation is generally obtainable by imaging the formation. Information typically gathered includes porosity, permeability, boundary layers and the like; which are often used to locate hydrocarbon bearing strata or reservoirs. This information is also generally useful when estimating potential yield and/or production capabilities of a particular region or reservoir. Often the imaging takes place from within a borehole that intersects the formation, and where a logging tool is inserted into the borehole. Typical imaging techniques employ nuclear devices in the logging tool that emit radiation into the formation, and which scatters from the formation back to the tool. Sensors in the tool record events of radiation scattered back from the formation, which is analyzed to discern information about the formation. Logging tools equipped with acoustic transmitters and acoustic receivers are also sometimes used for imaging subterranean formations. Acoustic signals from the acoustic transmitters propagate into the formation, where some of the signals reflect back to the tool and are recorded by the receivers. Similar to the nuclear tools, analyzing the reflected acoustic signals recorded by the receivers yields useful information about the formation.

SUMMARY OF THE INVENTION

Disclosed herein is an acoustic energy source for use with a downhole tool which includes a body mounted to a housing of the downhole tool, a first cavity in the body being filled with an elastomer material, a diaphragm coupled with the body adjacent to the first cavity filled with elastomer, and that selectively reciprocates borehole radially outward from the cavity and inward to the cavity. Also included in this example is a dynamic yoke having an end projecting into the outlet of a second cavity filled with a fluid material and an opposite end attached to a pressure disk embedded in the first elastomer filled cavity, the second fluid filled cavity having multiple opposing inlets. An electrically reactive actuator may be aligned collinearly with each inlet of the second fluid filled cavity to form an array of electrically reactive actuators, each actuator having a quill tip in contact with the electrically reactive actuator and each quill tip projecting into the second fluid filled cavity through each inlet. The array of electrically reactive actuators can be energized synchronously with a cyclically varying electrical voltage that causes the array of quill tips to uniformly displace relative to the second cavity, thereby causing the fluid in the second cavity to experience a net compression stress when the actuators extend, and a net tensile stress when the actuators contract. The quill tip of each actuator has an opposite end profiled substantially complimentary with a recess in the dynamic yoke, so that the second cavity is formed by a film of the fluid between the quill tips and the dynamic yoke and the acoustic source body profiled to conform to the quill tip geometry in a static yoke that is substantially coaxial with the dynamic yoke. The fluid can be substantially incompressible and has a viscosity that ranges up to about 10 cps. Optionally, the electrically reactive stack is made of at least one of a piezoelectric material and an electroactive polymer. A plurality of quill tips and electrically reactive stacks may be further included and that are set in the body and spaced apart from one another at substantially the same angle.

Another example of an acoustic energy source includes a body, a first cavity in the body, a displacement amplification assembly having a pressure disk projecting into the first cavity and having a dynamic yoke that projects into a second cavity, said dynamic yoke that is borehole radial movable and having profiled slots that project elevational radial inward from an outer periphery of the displacement amplification assembly, a diaphragm coupled with the body and perpendicular with the axis of the dynamic yoke, quill assemblies having tips that reciprocate within the profiled slots of the dynamic yoke and shaped complementary to respective profiled slots in the dynamic yoke, and fluid in the second cavity between the tips and the profiled slots of the dynamic yoke, so that when the tips reciprocate inward, a portion of the fluid displaced by the tips exerts a force on the dynamic yoke to urge the pressure disk into motion generating an acoustic body wave in the first cavity elastomer and reactionary motion of the acoustic diaphragm. The quill tips and profiled slots may be strategically formed and sized so that a film of the fluid is disposed between the quill tips and profiled slots. In this example, a force is transferred from the quill tips to the fluid that substantially exceeds a frictional force exerted by the fluid onto the quill tips. Piezoelectric stacks may also be included for reciprocating the quill tips. Optionally, the fluid between the quill tips and slots approximates a thin walled manifold. The acoustic energy source may further include a static yoke formed in the body that is substantially coaxial with the motion of the dynamic yoke, and wherein a portion of each slot is formed in the dynamic yoke and a portion of each slot is formed in the static yoke.

Also disclosed herein is a method of generating acoustic energy that involves providing a housing with a dynamic yoke within the housing, quill assemblies that project laterally within housing, a diaphragm on the housing, and fluid between the dynamic yoke and quill assemblies. The method further includes generating acoustic signals by reciprocating the quill assemblies along paths that intersect with an axis of the housing to reciprocatingly force the dynamic yoke to generate an acoustic wave in the first elastomer cavity against the diaphragm, the quill assemblies and the dynamic yoke being configured so that interaction between the quill assemblies and the dynamic yoke creates a pressure transfer in the film of the fluid between the quill assemblies and dynamic yoke. In an example of the method, the film resembles a thin walled manifold. Optionally, the film fluid can be water, silicon oil, glycerin, liquid metal galinstan, or combinations thereof. The fluid film may alternatively have a substantially constant thickness adjacent the entire surface of the quill tip. In an example, substantially all of the energy of reciprocation of the quill assemblies is transferred to the dynamic yoke through the film of fluid.

BRIEF DESCRIPTION OF DRAWINGS

Some of the features and benefits of the present invention having been stated, others will become apparent as the description proceeds when taken in conjunction with the accompanying drawings, in which:

FIG. 2 is a perspective view of one of the transducers of FIG. 1 and in accordance with the present invention.

FIG. 3 is a sectional view of the transducer of FIG. 2 taken along lines 3-3 and in accordance with the present invention.

FIG. 4 is a perspective view of an embodiment of a quill assembly for use with a one of the transducers of FIG. 1 and in accordance with the present invention.

FIG. 5 is a sectional view of the quill assembly of FIG. 4 taken along lines 5-5 and in accordance with the present invention.

FIG. 5A is a sectional view of a portion of the quill assembly of FIG. 5 in accordance with the present invention.

FIG. 10 is an exploded view of an example of the transducer of FIG. 2 and in accordance with the present invention.

Figure 1:
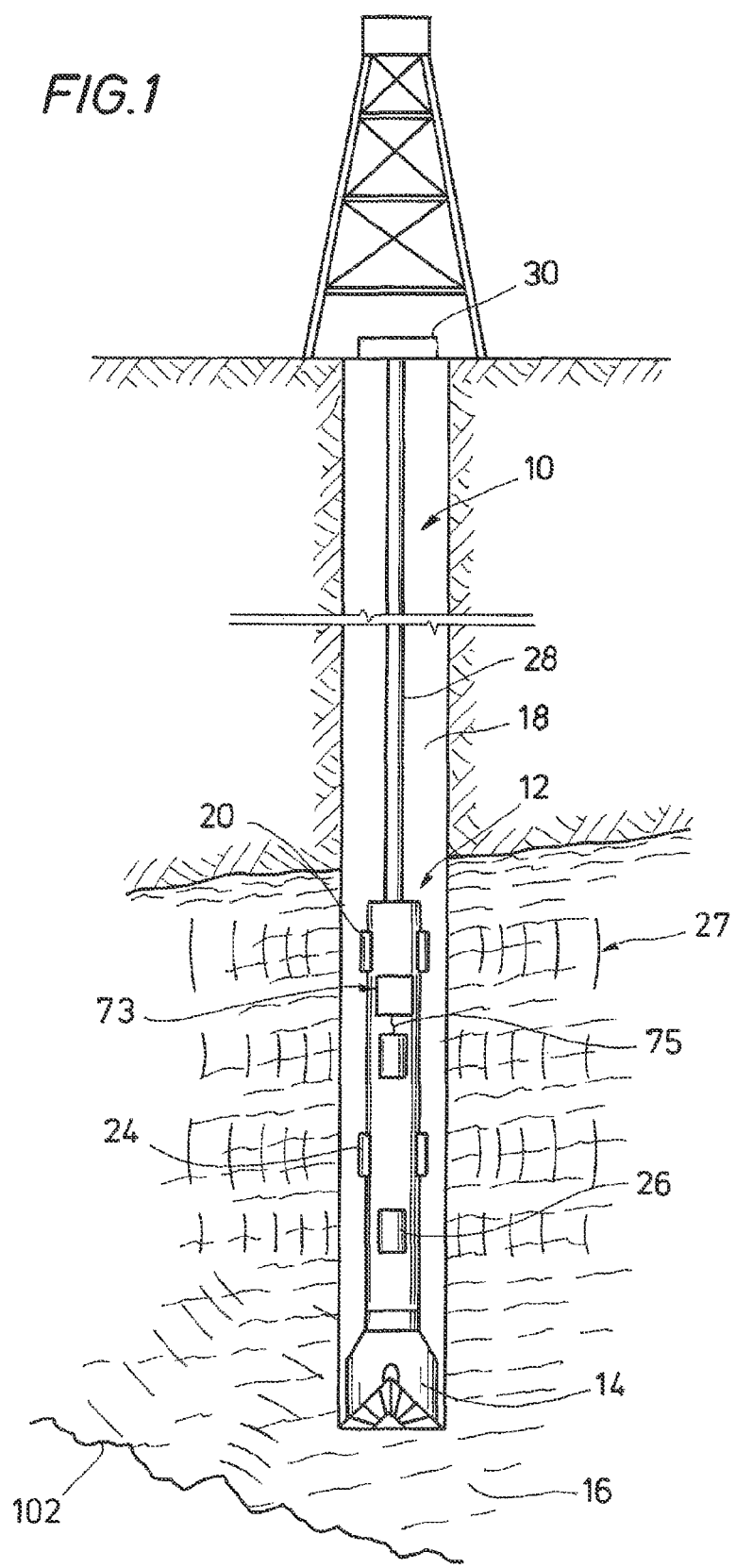
FIG. 1 is a side partial sectional view of an embodiment of a drilling system forming a borehole and having acoustic transducers on a bottom hole assembly and in accordance with the present invention.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term about includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Shown in a partial side sectional view in FIG. 1 is one example of a drilling system 10 wherein a bottom hole assembly 12 is shown having a bit 14 bore excavating through a formation 16. A wellbore 18 is formed by excavating with the bit 14 and wherein acoustic transducers 20 are included on the bottom hole assembly 12, where the transducers 20 are transmitters 24 and receivers 26. Shown in the example are waves 27 that propagate from the transmitters 24, reflect from discontinuities within the formation 16, and propagate back towards the bottom hole assembly 12 and sensed by the receivers 26. Further in the example, a drill string 28 and rotary table 30 are used to rotate the bit 14 for forming the wellbore 18. An advantage of the bottom hole assembly 12 is that the waves 27 can be propagated forward of the bit 14 so that information about the formation 16 ahead of the bit 14 can be imaged and used in making decisions regarding drilling operations. One example of a decision can be to direct the bit 14 along a particular path, and/or adjust the rate of drilling. Other decisions include adjusting parameters of drilling mud (not shown) used in conjunction with the drilling operation.

A side perspective view of one example of a transmitter 24 is shown FIG. 2. In this example, the transmitter 24 is shown having a generally planar and rectangular body 32; elongate tuned resonant mounts 34 are on corners of the body 32 disposed in an axial direction and set within recesses 35 in the corners of the body 32. Bores 36 are shown formed radially through sidewalls of the body 32. Quill assemblies 38 are further illustrated inserted within each of the bores 36. A protective cover 40 is shown spanning an upper surface of the body 32, which provides environmental protection for the working components of the transmitter 24 housed within body 32. Apertures 42 are further illustrated formed through the cover 40 that provide fluid communication between working portions of the transmitter 24 and fluid in the wellbore 18 (FIG. 1). An example of a known acoustic transducer is found in U.S. patent application Ser. No. 13/272,396, which is assigned to the assignee of the present application, and which is incorporated by reference herein in its entirety for all purposes.

In FIG. 3, a side sectional view of transmitter 24 is shown that depicts a diaphragm 44 set underneath cover 40 and spanning an opening 45 on the upper surface of body 32. Opening 45 defines an upper terminal end of a first cavity 46 in body 32, where first cavity 46 depends axially downward from the upper surface of body 32 and defines a volume having elastomer material that selectively transmits an acoustic body wave that causes diaphragm 44 to oscillate. In the example of FIG. 3, the quill assemblies 38 are shown having an electroactive element 48, such as a stack of piezo-electric elements, that responds to applied electricity by expanding and/or contracting. Conically shaped quill tips 50 are set on the ends of the electroactive elements 48 that are directed radially inward. In an example, quill tips 50 are in a plane perpendicular to the motion of the diaphragm 44. Moreover, the quill tips 50 are oriented so that their respective smaller diameter portions are positioned radially inward from the larger diameter portions.

Shown set in a second cavity 51 in the body 32 is a dynamic yoke 52, that when viewed in cross-section has a lower portion that is frusto-conical and downward facing. Above the lower portion, the dynamic yoke 52 transitions into an upper portion whose cross section is generally rectangular and has a generally cylindrical body. The lower frusto-conical portion of the dynamic yoke 52 is shown adjacent the radially inward facing quill tips 50. The respective shapes of the lower frusto-conical portion dynamic yoke 52 and quill tips 50 are complimentary shaped. So that when the quill tips 50 project radially inward, the interaction between the quill tips 50 and dynamic yoke 52 (through a connecting fluid medium) urges the dynamic yoke 52 axially upward with respect to the perpendicular plane and in a direction parallel with axis $A_X$ of body 32. A static yoke 53 is shown formed in the lower portion of body 32, and which projects axially upward. The upper surface of the static yoke 53 is complimentary-shaped to the adjacent surfaces of the quill tips 50. Fluid 54 is confined in second cavity 51 and that occupies the space between the yoke 52, 53 and quill tips 50. Strategically shaping the yokes 52, 53 and quill tips 50 results in the fluid 54 being a film in the space between the yokes 52, 53 and quill tips 50. As will be discussed in more detail below, an advantage of the fluid 54 being a film rather than residing in a larger space is that when the quill tips 50 reciprocate in the second cavity 51 and within fluid 54, compression-tension forces from interaction with the fluid 54 are greatly amplified, thereby vastly increasing displacement amplification and acoustic output efficiency of the transmitter 24. Further shown in FIG. 3 is a plate like pressure piston 55 mounted on an upper end of dynamic yoke 52 and generally coaxial with axis $A_X$. As shown, the outer periphery of piston 55 depends upward away from dynamic yoke 52 and oblique with axis $A_X$. Also illustrated are disk-like covers 56 mounted in body 32 that provide the outer radial portion of quill assemblies 38 and are for retaining and isolating pressure compensating oil within the quill assemblies 38 within body 32.

An example of a quill assembly 38 is shown in a side perspective view in FIG. 4. In this embodiment quill assembly 38 includes a forward housing 62 which is coaxial with quill tip 50. A portion of forward housing 62 has a larger diameter, which defines a shoulder 63 circumscribing the forward housing 62, and which is shown adjacent the quill tip 50. Forward housing 62 is a generally annular member and having threads on an outer surface on an end distal from the shoulder 63. Threadingly connected to a rearward portion of forward housing 62 is a rearward housing 64 which also has a generally circular outer surface and extends axially away from forward housing 62. At the aft end of rearward housing 64 is a raised or increased diameter portion that defines a threaded shoulder 65 on the rearward end of quill assembly 38 and distal from shoulder 63. Like forward housing 62, rearward housing 64 is an annular member, but with threads on an inner surface that engage threads on forward housing 62. Flats 66, 67 provide surfaces for a wrench assembly (not shown) to engage forward and rearward housings 62, 64.

FIG. 5 is an axial sectional view of quill assembly 38 and taken along lines 5-5 of FIG. 4. Here the electroactive element 48 is shown inserted within the coaxially and threadingly joined forward and rearward housing 62, 64. A planar and disk-like preload adapter 68 shown coaxial with quill assembly 50 and maintains preload on the electroactive element 48 and attaches to rearward facing surface of quill tip 50 through a threaded stud. In one example, the preload adapter 68 may exert a compressional load onto electroactive element 48 so that by tightening the forward and rearward housing 62, 64 a compressional preload may be exerted onto the electroactive element 48, which has significant advantages when the material is a piezo-electric material. A cavity 70 is shown in the space between electroactive element 48 and inner surfaces of forward and rearward housing 62, 64. Electrical leads 72 project axially away from a portion of electroactive element 48 and are positioned within cavity 70. A power source 73 (FIG. 1) may be used to power the electroactive element 48. Wireway holes 74 shown formed obliquely through the aft end of rearward housing 64 may provide access from wires 75 (FIG. 1) and into electrical leads 72 for energizing the electro element 48.

FIG. 5A shows a detailed view of a portion of the forward end of quill assembly 38. In this sectional view, a foil seal 77 is provided on an outer circumference of quill tip 50 and projects radially outward into sealing contact with a forward facing surface of shoulder 63. Foil seal 77 is a thin member and between quill tip 50 and forward housing 62 includes a curved portion that serves as a flexural bend 78. Thus, flexural bend 78 allows axial movement of quill tip 50 along axis $A_Y$ with minimal force and while still maintaining a fluid seal between the forward surface of quill tip 50 in forward housing 62.

Figure 6:
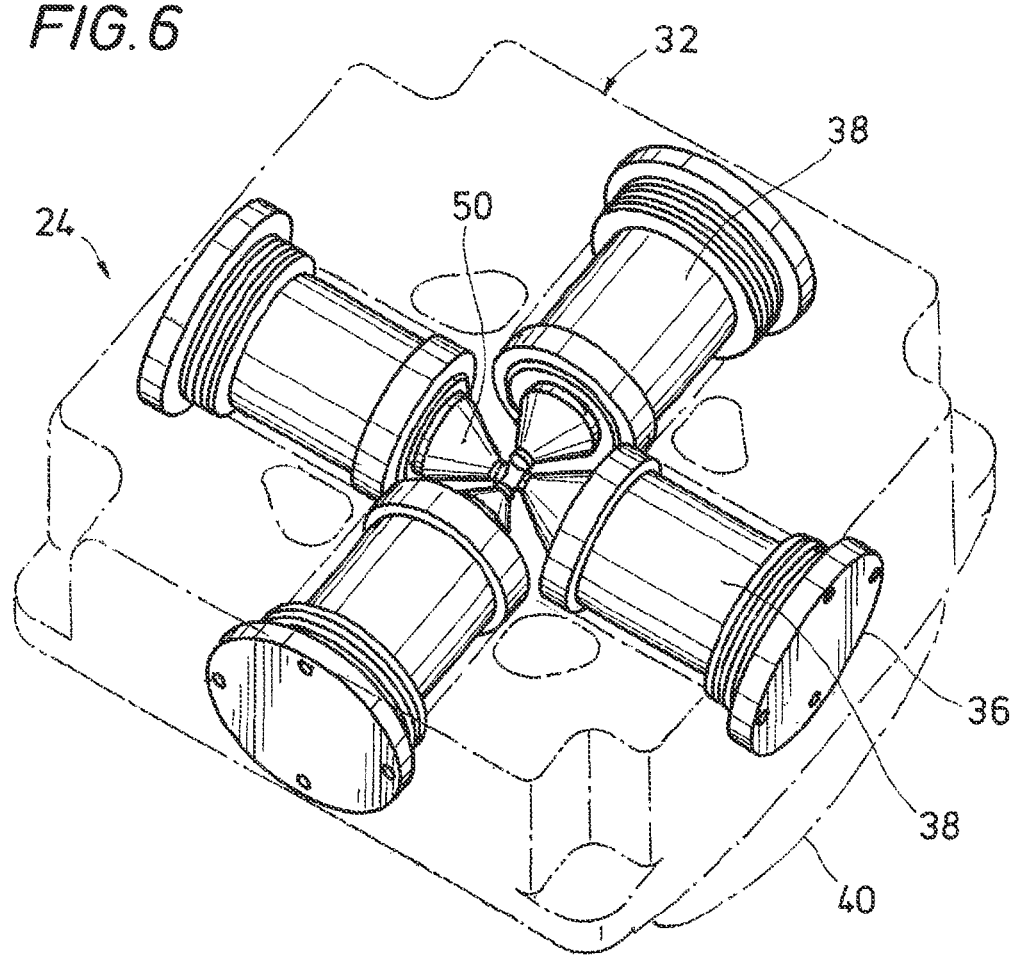
FIG. 6 is a perspective view of an example of an acoustic transducer with a housing illustrated in phantom view and in accordance with the present invention.
Figure 7:
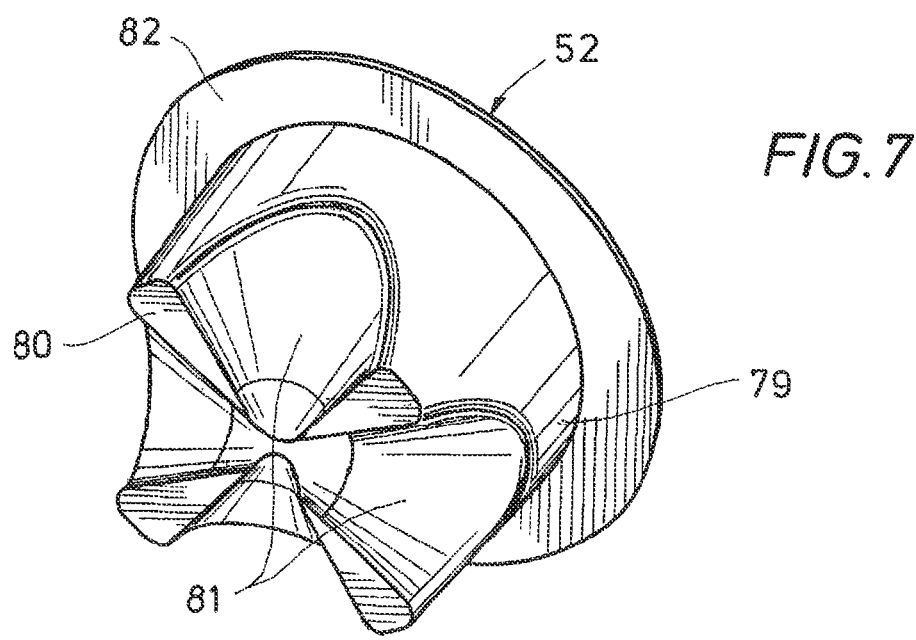
FIG. 7 is a perspective view of an example of a dynamic yoke for use with one of the transducers of FIG. 1 and in accordance with the present invention.

Referring now to FIG. 6, shown in perspective view is an example of the transducer 24; wherein body 32 is illustrated in phantom view. Here, four quill assemblies 38 are shown set within body 32 and aligned in bores 36. As such, the quill tips 50 of each quill assembly 38 are arranged such that they point radially inward and adjacent one another. Referring to FIG. 7, shown in a perspective view is the dynamic yoke 52. The dynamic yoke 52 has a body 79 with a largely circular outer circumference and a downward facing surface 80 which selectively forms a gap with an upward facing surface (not shown) of static yoke 53 (FIG. 3). Slots 81 are shown formed in the body 79 that extend axially away from lower surface 80 and radially outward to define a series of saddle like profiles in the lower surface 80. A flange 82 is shown projecting radially outward from an outer periphery of body 79 and includes a curved portion that serves as a flexural bend and spaced axially away from lower surface 80.

Figure 8:
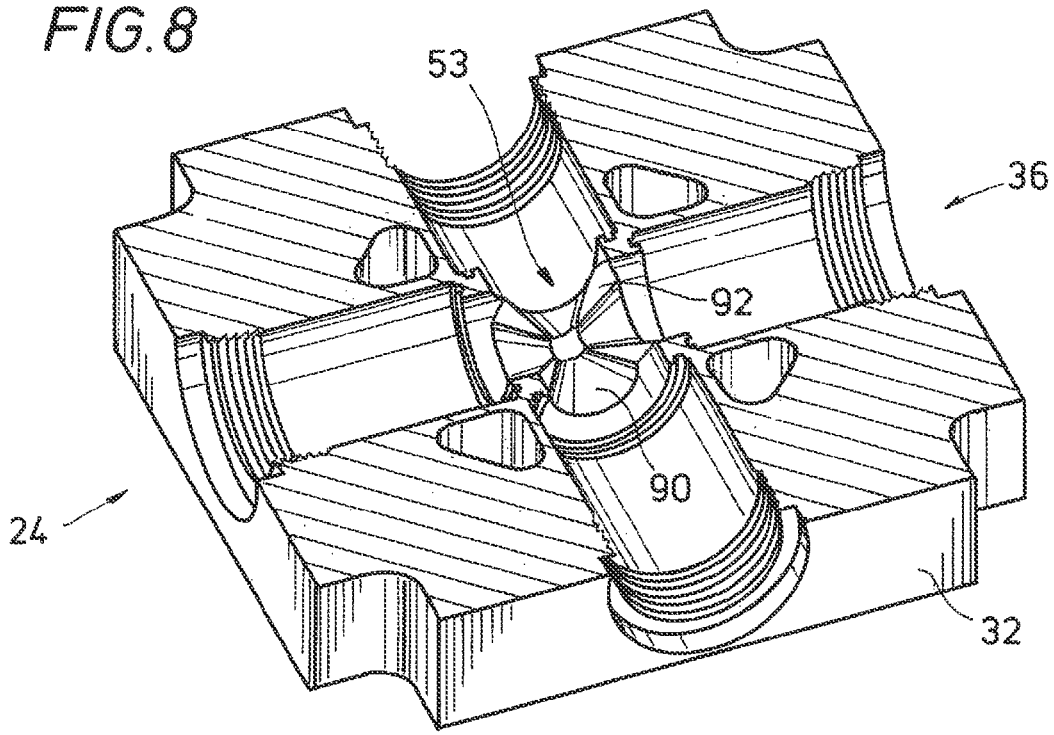
FIG. 8 is a perspective sectional view of an example of the body of the transducer of FIG. 2 taken along lines 8-8 and in accordance with the present invention.

FIG. 8 shows an upward facing lower portion of body 32 and taken along lines 8-8 of FIG. 2. In this example, lower portions of radial bores 36 are shown, where the bores 36 extend outward from the cavity formed by dynamic yoke 52 and the static yoke 53. Slots 90 provided in static yoke 53 are similar to slots 81 of dynamic yoke 52 (FIG. 7). Moreover, as will be discussed in more detail below, when dynamic yoke 52 mates to form a gap with static yoke 53, slots 81 align with slots 90 and form profiles that are substantially complimentary to quill tips 50. An upper surface 92 of static yoke 53 forms a gap with lower surface 80 of dynamic yoke 52 (FIG. 7).

Figure 9:
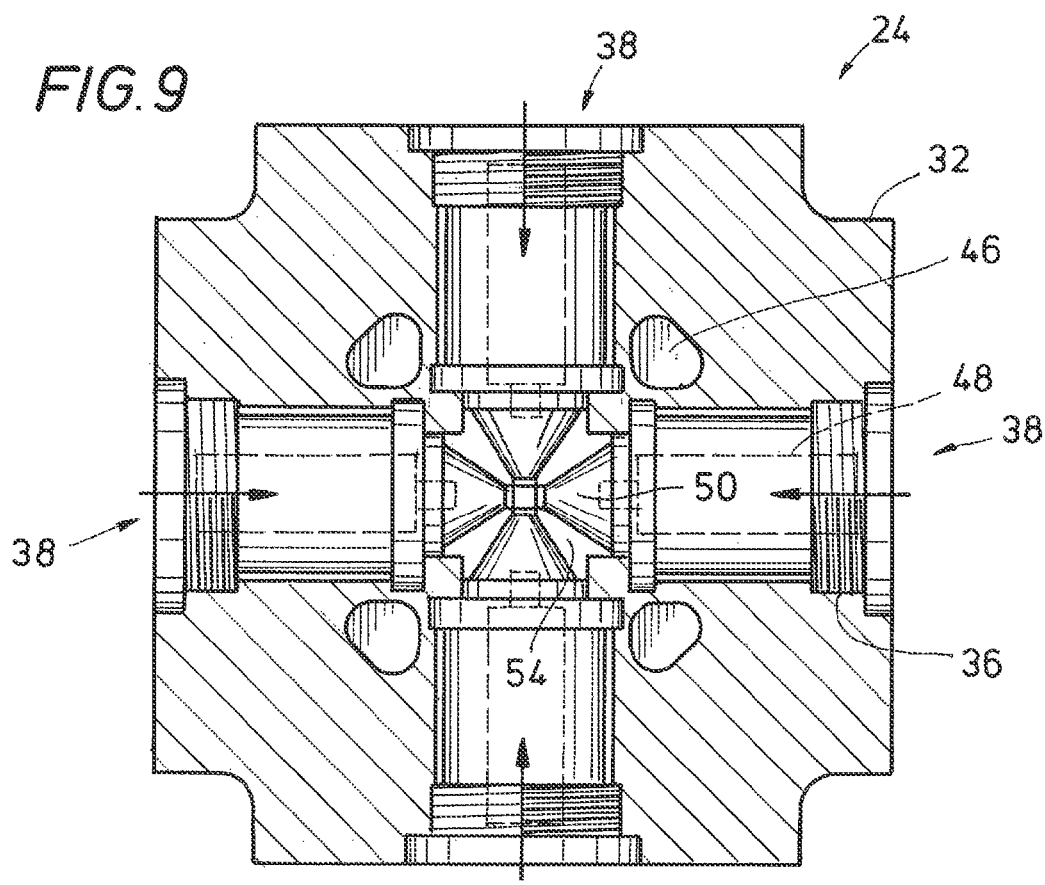
FIG. 9 is a perspective sectional view of the transducer of FIG. 2 taken along lines 9-9 and in accordance with the present invention.

An upward looking sectional view of body 32 is shown in FIG. 9 in which is taken along lines 9-9 of FIG. 2. In this example, a portion of fluid 54 in second cavity 51 between quill tips 50 and dynamic yoke 52 and static yoke 53 is shown in that in one example forms a manifold fluid film between quill tips 50 in the dynamic and static yokes 52, 53 (FIG. 3). Further shown are portions of first cavity 46, which in an example contain an elastomer, and that are intersected by the section view.

FIG. 10 shows an example of embodiment of the transmitter 24 in an exploded view. In this example, dynamic yoke 52 is shown axially spaced away from static yoke 53 and illustrates one example of a direction how dynamic yoke 52 may axially reciprocate with respect to static yoke 53. Moreover, the electro active material 48 is illustrated in an uncompressed configuration and prior to threaded assembly of inner and outer housing 62, 64. Tuned resonant mounts 34 are illustrated axially spaced from attachment surfaces of body 32. Cover 56 is illustrated radially outward from outer housing 64 and with a series of holes there through for threadingly mounting cover 56 to body 32. Further shown in FIG. 10 is a diaphragm 44 having pockets therein for reducing its mass. Optional embodiments of diaphragm 44 include a substantially solid membrane-like diaphragm 44. Additionally, a threaded stud is shown on an upper surface of dynamic yoke 52 for attachment with threaded hole of pressure piston 55.

Figure 11A:
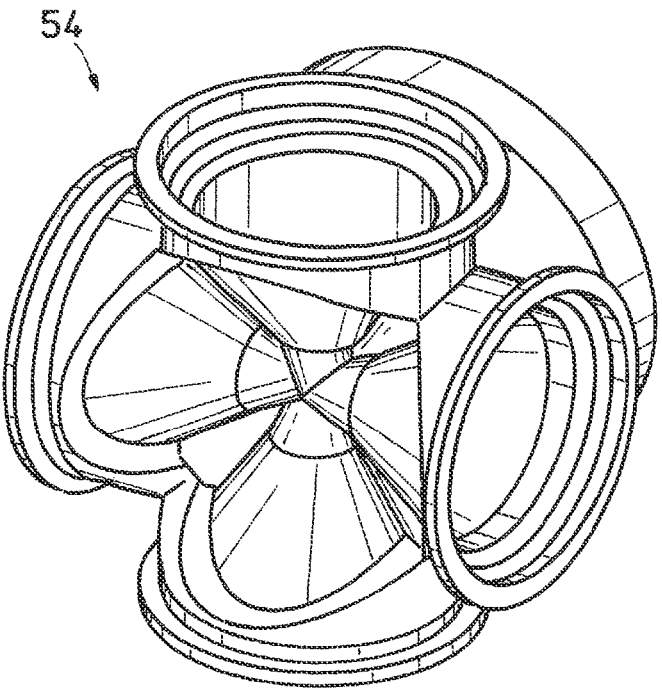
FIGS. 11A and 11B are lower and upper perspective views of an example of a manifold film formed within the transducer of FIG. 2 and in accordance with the present invention.
Figure 11B:
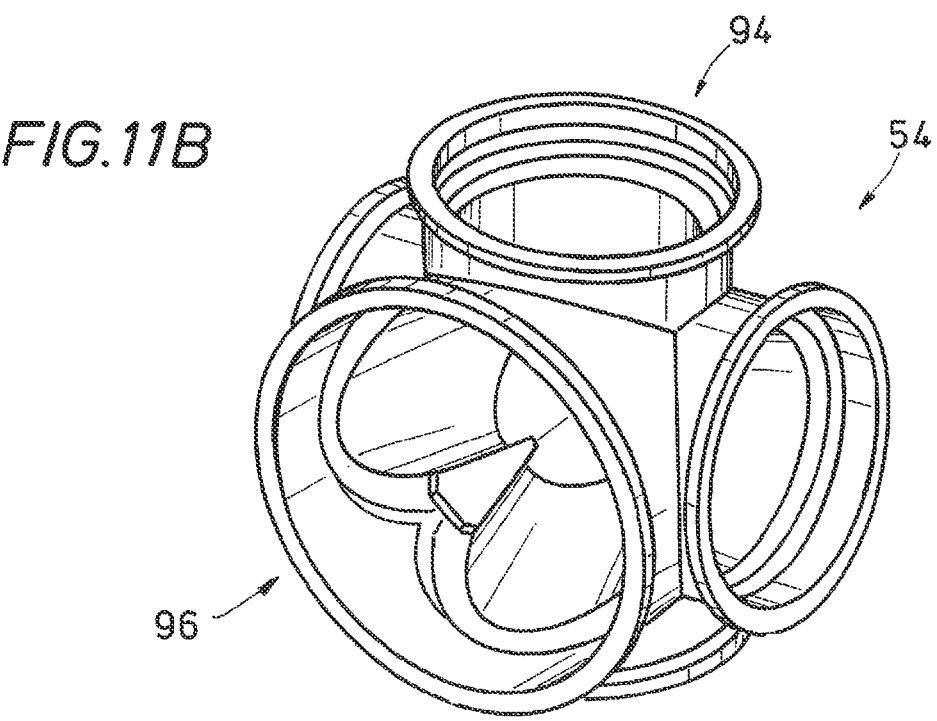
Figure 12:
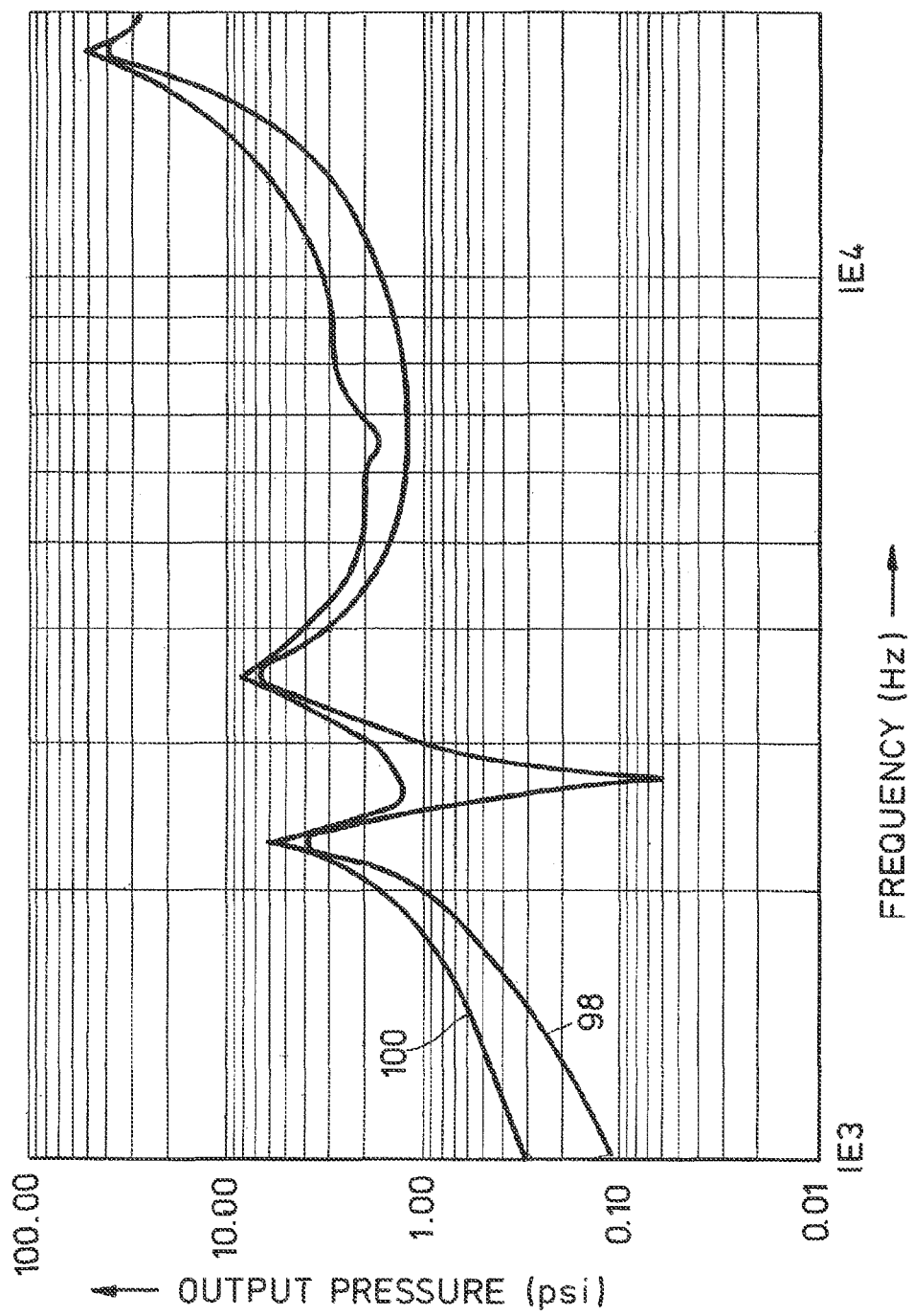
FIG. 12 is a plot of an example of an acoustic output frequency response of the transducer of FIG. 2 and in accordance with the present invention.

FIGS. 11A and 11B are upward and lower facing perspective views of the film of fluid 54 in the second cavity 51 and as it may exist between the quill assemblies 38 and yokes 52, 53. Specifically, with reference to FIG. 11B, the fluid film 54, which noted above may approximate a manifold fluid film, resembles a manifold-like configuration that is substantially thinned walled and has openings on its lateral and upper side. On its lateral side are inlet ports 94 and through which the quill assemblies 38 (FIG. 2) may be inserted. An outlet port 96 which is coaxial about an axis joining perpendicular to an axis intercepting the inlet ports would circumscribe the dynamic yoke 52.

In one example of operation, electricity, which can be alternating voltage, from power source 73 is selectively communicated with the electroactive element 48 in a way to reciprocate the quill tips 50. When reciprocating, the quill tips 50 project radially inward synchronously, therefore displacing fluid 54 from within second cavity 51. Fluid 54, which is sealed in a confined space, is displaced by the radially inward projection of the quill tips 50 and generates a resulting upward force on dynamic yoke 52 to urge pressure piston 55 to generate an acoustic body wave in the first cavity filled with elastomer, said acoustic body wave impinging against diaphragm 44 for creating the acoustic waves 25 that may selectively be directed into formation 16 when the acoustic source is disposed downhole. Motion of the acoustic diaphragm and components of the source assembly couple with the flexibility of the tuned resonant mounts 34 to create a sequence of resonant responses of acoustic pressure output. Strategic dimensioning of the components of the transmitter 24 that result in the fluid 54 being a substantially film like configuration between the quill tips 50 and yokes 52, 53 (FIG. 3) amplifies the compressive-tension forces transferred to the fluid 54 from the quill tips 50, and couples with the flexibility of the tuned resonant mounts 34 to result in an efficient transfer of energy to diaphragm 44 over a desired broad range of frequencies of operation. To illustrate the acoustic energy produced, plots 98, 100 are provided in FIG. 4 in a graph where the abscissa represents acoustic source operating frequency in Hertz (Hz) and the ordinate represents output pressure in pounds per square inch (psi) at 1 m distance in water. Plot 98, this non-illuminating example illustrates the peak magnitude of a steady state 20 transient cycle response whereas plot 100 shows the peak magnitude of a shorter duration transient 10 cycle response. Each plot shows a fundamental resonant frequency occurring at or about 2.3 Kilohertz with acoustic outputs of up to 3.8 psi.

Example fluids for the fluid 54 include water, silicon oil, and galinstan liquid metal. These fluids are minimally viscous and substantially and/or highly incompressible. In an example, substantially and/or highly incompressible means that the volume of the fluid changes less than 0.1% when subjected to maximum expected operating pressures. Example physical properties have a viscosity of less than about 10 CPS. In another example, the bulk modulus of the fluid could be at least about 10,000 MPa. Examples of the power source include capacitors, and a recharging mud motor that is part of the bottom hole assembly.

In an example, the fluid used to fill the second cavity is highly incompressible and has minimal viscosity (less than 10 cPs) and the parts forming the second cavity are profiled to minimize the total fluid volume in the second cavity, causing the magnitudes of the cyclic compression and tensile stress in the second cavity fluid to be amplified and the dynamic yoke to react with a cyclic displacement. The cyclic displacement of the dynamic yoke can cause comparable cyclic displacement of the pressure disk being embedded in the elastomer filled first cavity, developing an acoustic body wave in the elastomer filled first cavity, said acoustic body wave impinging on the acoustic diaphragm and causing reactionary cyclic displacement of the acoustic diaphragm. In one embodiment, the magnitude of the acoustic energy transmitted by the source into the borehole fluid and geological formation is directly related to the magnitude of the diaphragm displacement and can be optimized for specific acoustic magnitudes and cyclic frequency bandwidths with appropriate selection of combinations of dynamic yoke profile, quill tip profile, second cavity fluid material properties, second cavity fluid volume, first cavity elastomer properties, and first cavity geometry and volume.

An advantage of the design of the yokes 52, 53, and quill assembly 38 described herein is that the mating parts conform to develop a tightly confined "thin fluid gap" in the highly incompressible fluid in the second cavity; which in turn forms a "thin film manifold." Thus excess fluid volume is eliminated that remained outside the "thin fluid gap" in the previous designs which prevented sufficient pressure generation to achieve amplification at the output. The design as described herein also eliminates asymmetric dynamic modes at piezo actuator pistons that plagued previous designs which was due to an asymmetry in cross-section that created conspicuous pressure gradients in the fluid and excessive fluid shear distributions in the fluid used. Instead, fluid in the present design experiences primarily oscillations in hydrostatic pressure and not fluid shear forces. By isolating the forces in the fluid to be pressure and not shear, results in much higher values of pressure transfer across the fluid gap, thereby increasing the efficiency of the system.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. An acoustic energy source for use with a downhole tool comprising:
    a body mounted to a housing of the downhole tool;
    a first cavity in the body having an elastomer;
    a second cavity in the body having a fluid;
    a diaphragm coupled with the body adjacent the first cavity, and that selectively reciprocates axially outward from the first cavity and axially inward to the first cavity;
    a dynamic yoke having an end projecting into the second cavity and an opposite end holding a pressure disk projecting into the first cavity and embedded in the elastomer of the first cavity;
    a plurality of electrically reactive stacks that are each selectively energized into an oscillatory extended and contracted configuration;
    a plurality of quill tips each having an end in contact with a one of the electrically reactive stacks and each is moved radially inward when an associated electrically reactive stack is in the extended configuration, and each is moved radially outward when an associated electrically reactive stack is in the contracted configuration, and each quill tip having an opposite end profiled substantially complimentary with a recesses in the dynamic yoke, so that a film of the fluid in the second cavity remains between each quill tip and the dynamic yoke when the electrically reactive stacks are in the extended configuration and in the contracted configuration; and a tuned resonant mount having an end attached to the body and an opposite end attached to the downhole tool, and that couples dynamically with motion of the diaphragm to create resonant response of the acoustic output of the source at designated operational frequencies and ranges.

2. The acoustic energy source of claim 1, further comprising a static yoke mounted in the second cavity and substantially coaxial with the motion of the dynamic yoke.

3. The acoustic energy source of claim 2, further comprising a recess in the static yoke profiled to receive the quill tip.

4. The acoustic energy source of claim 1, wherein the fluid is substantially incompressible and has a viscosity that ranges up to about 10 cps.

5. The acoustic energy source of claim 1, wherein the electrically reactive stack comprises at least one of a piezoelectric material.

6. The acoustic energy source of claim 1, wherein the plurality of quill tips and electrically reactive stacks that are spaced apart from one another at substantially the same angle.

7. The acoustic energy source of claim 1, wherein the quill tip and dynamic yoke are strategically spaced apart from one another so that when the quill tip reciprocates with respect to the dynamic yoke an amount of fluid in the second cavity displaced by the quill tip urges the dynamic yoke to create motion of the pressure disk and generate an acoustic body wave in the elastomer of the first cavity, said acoustic body wave propagating through the elastomer of the first cavity and impinging on the diaphragm causing motion of the diaphragm.

8. An acoustic energy source comprising:
a body;
a first cavity in the body;
elastomer in the first cavity;
a second cavity in the body;
fluid in the second cavity;
a displacement amplification assembly in the second cavity having a dynamic yoke that is axially movable and having profiled slots that project radially inward from an outer periphery of the displacement amplification assembly;
a diaphragm coupled with the body and coplanar with the dynamic yoke;
quill assemblies having quill tips that reciprocate within the dynamic yoke profiled slots and shaped complementary to respective dynamic yoke profiled slots;
piezoelectric stacks for reciprocating the quill tips that are selectively energized into oscillatory extended and contracted configurations; and
fluid in the second cavity between the tips and the profiled slots, so that when the tips reciprocate radially inward, from oscillatory extension of the piezoelectric stacks, a portion of the fluid displaced by the tips exerts an axial force on the dynamic yoke to generate an acoustic body wave in the elastomer of the first cavity and reactionary motion of the diaphragm.

9. The acoustic energy source of claim 8, wherein the quill tips and profiled slots are strategically formed and sized so that a film of the fluid is disposed between the quill tips and profiled slots.

10. The acoustic energy source of claim 9, wherein a force is transferred from the quill tips to the fluid that substantially exceeds a frictional force exerted by the fluid onto the quill tips.

11. The acoustic energy source of claim 8, wherein the fluid between the quill tips and slots approximates a thin walled manifold.

12. The acoustic energy source of claim 8, further comprising a static yoke formed in the body that is substantially coaxial with the motion of the dynamic yoke, and wherein a portion of each slot is formed in the dynamic yoke and a portion of each slot is formed in the static yoke.

13. A method of generating acoustic energy comprising:
providing a housing with a dynamic yoke within the housing, quill assemblies that project laterally within housing, and that comprise piezodlectric stacks cavity in the housing, a diaphragm on the housing, a tuned resonant mount for creation of specific magnitudes of acoustic output at desired frequencies and ranges of operation and fluid between the dynamic yoke and quill assemblies; and
generating acoustic signals by selectively energizing the piezoelectric stacks to reciprocate the quill assemblies into oscillatory extended and contracted configurations and along paths that intersect with an axis of the housing to reciprocatingly force the dynamic yoke through fluid interaction to generate acoustic body waves in an elastomer in the cavity to impinge on the diaphragm, the quill assemblies and the dynamic yoke being configured so that interaction between the quill assemblies and the dynamic yoke creates pressure transfer across a film of the fluid between the quill assemblies and dynamic yoke.

14. The method of claim 13, wherein the film resembles a thin walled manifold.

15. The method of claim 13, wherein the fluid is selected from the list consisting of water, silicon oil, glycerin, liquid metal galinstan, and combinations thereof.

16. The method of claim 13, wherein the fluid film has a substantially constant thickness adjacent the entire surface of the quill tip.

17. The method of claim 13, wherein substantially all of the energy of reciprocation of the quill assemblies is transferred to the dynamic yoke through the film of fluid.

* * * * *